Aug. 2, 1960    H. F. UMSTOTT    2,947,060
APPARATUS FOR CONTROLLING TENSION IN SHEET MATERIAL
Filed Sept. 21, 1955    3 Sheets-Sheet 1
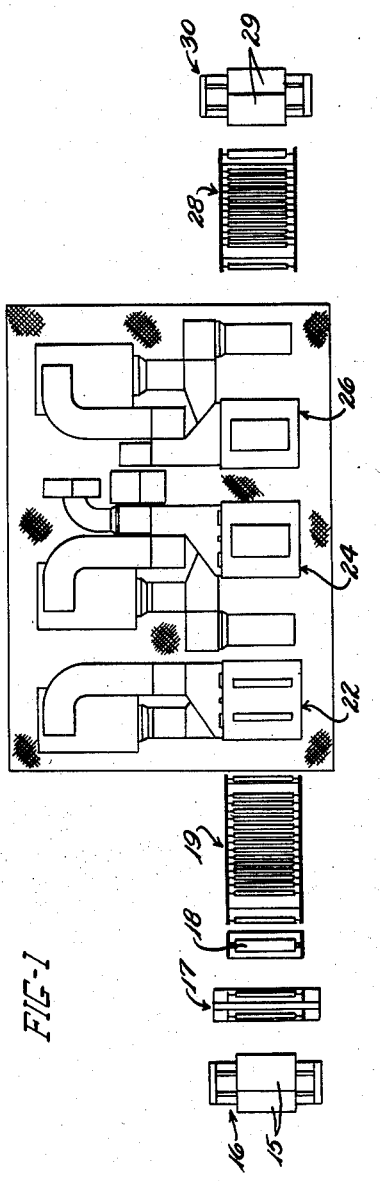
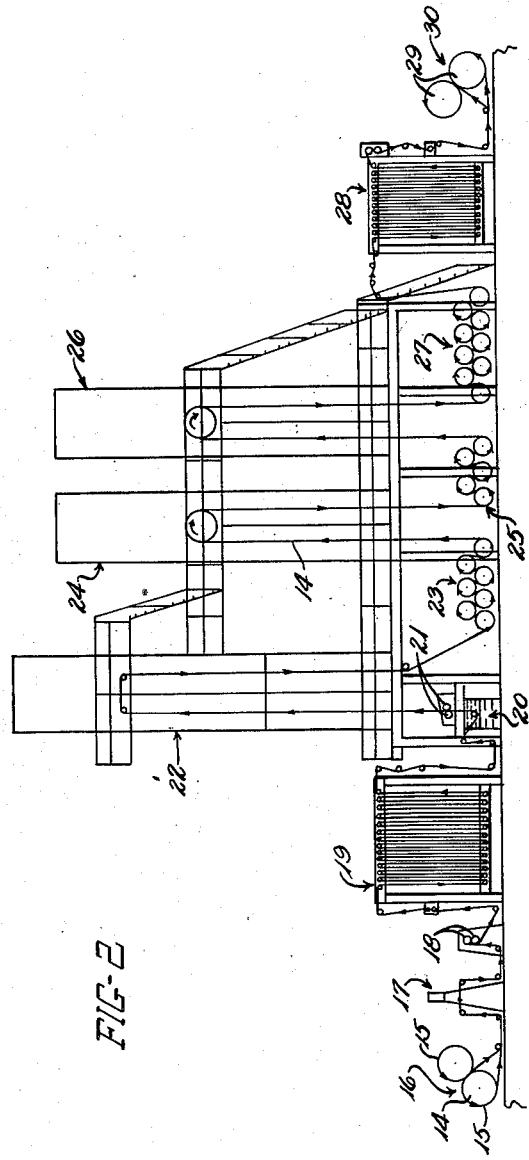
INVENTOR.
HAROLD F. UMSTOTT
BY
W. A. Fraser
ATTY.

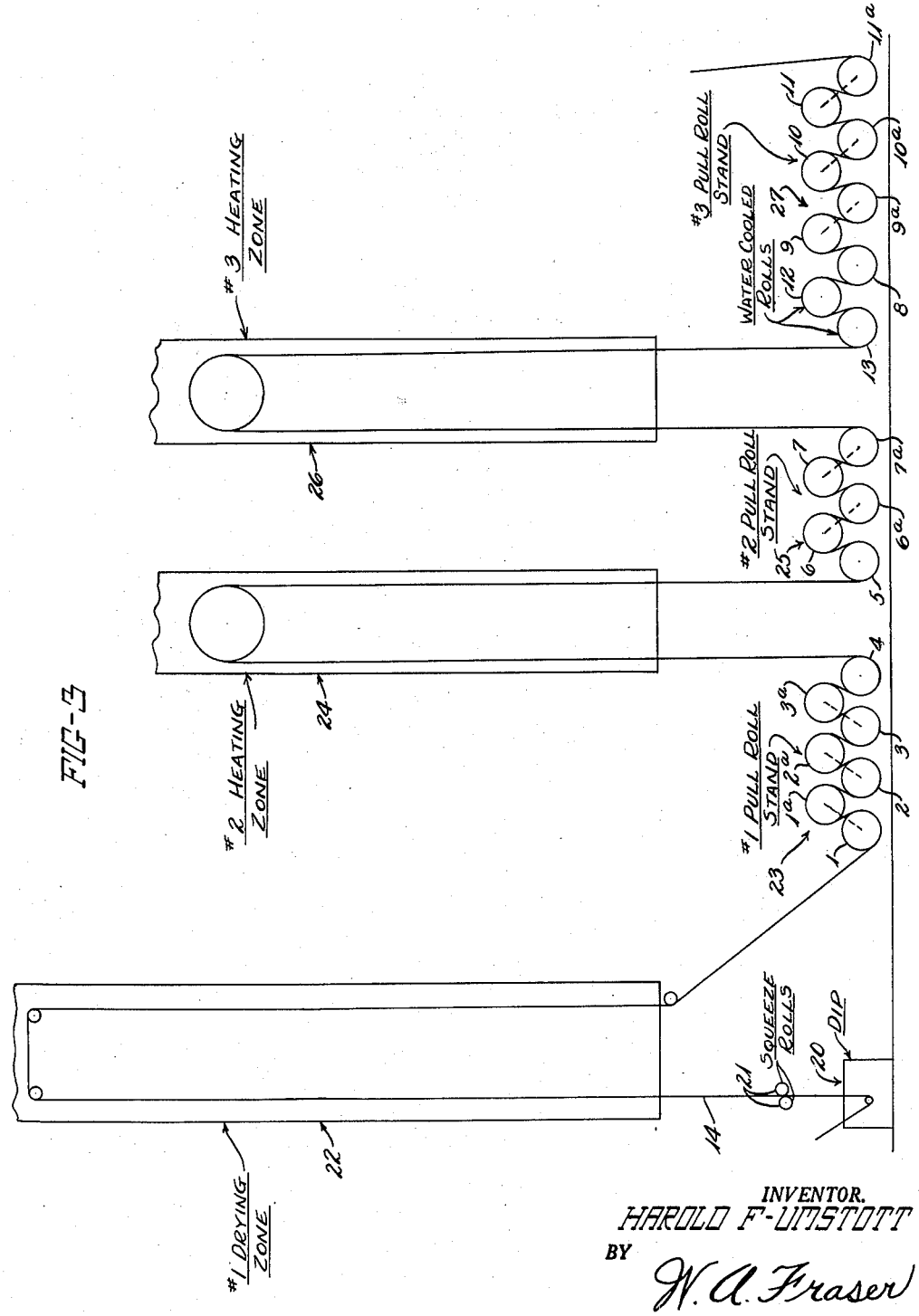

NYLON LENGTH CHANGE

| STATION | | YARDS PER MIN. | ROLL R.P.M. | FABRIC LENGTH % |
|---|---|---|---|---|
| SQUEEZE ROLLS | | 60 | 57.2 | 100 |
| #1 DRYING ZONE | | | | |
| #1 PULL ROLL STAND | ROLLS 1 & 1ᵃ | 61.8 | 50.6 | 103 |
| | ROLLS 2 & 2ᵃ | 62.7 | 51.3 | 104.5 |
| | ROLLS 3 & 3ᵃ | 63.6 | 52.1 | 106 |
| | ROLL 4 | 64.8 | 53 | 108 |
| #2 HEATING ZONE | | | | |
| #2 PULL ROLL STAND | ROLL 5 | 67.8 | 55.5 | 113 |
| | ROLLS 6 & 6ᵃ | 67.6 | 55.3 | 112.5 |
| | ROLLS 7 & 7ᵃ | 67.2 | 55 | 112 |
| #3 HEATING ZONE | | | | |
| #3 PULL ROLL STAND | ROLL 8 | 68.2 | 55.7 | 114 |
| | ROLLS 9 & 9ᵃ | 67.5 | 55.3 | 112.5 |
| | ROLLS 10 & 10ᵃ | 66.6 | 54.6 | 111 |
| | ROLLS 11 & 11ᵃ | 66.3 | 54.3 | 110.5 |

NET LENGTH CHANGE: 10.5%

FIG-4

INVENTOR.
HAROLD F. UMSTOTT
BY W. A. Fraser
ATTY.

United States Patent Office 2,947,060
Patented Aug. 2, 1960

2,947,060

APPARATUS FOR CONTROLLING TENSION IN SHEET MATERIAL

Harold F. Umstott, Akron, Ohio, assignor to The Firestone Tire & Rubber Company, Akron, Ohio, a corporation of Ohio Filed Sept. 21, 1955, Ser. No. 535,718

3 Claims. (Cl. 28—1)

This invention relates to an apparatus and a method for treating nylon fabric to produce a high strength material suitable for the manufacture of tires.

Because its tensile strength is considerably higher than that of cotton or rayon, nylon offers many advantages as a tire ply material. Accordingly, nylon tires are usually lighter, stronger and cooler running than tires of other material.

There are, however, two objectionable characteristics of nylon; its tendency to stretch and elongate in a tire, which is called "growth"; and its heat-shrinkage, i.e. its tendency to shrink when subjected to the heat of vulcanization of a tire. Excessive growth will cause the tire to enlarge abnormally and distort in service. The heat-shrinkage of nylon is sometimes great enough to pull the ends of the tire fabric free from the beads of the tire during vulcanization, preventing the tire from molding properly.

In order to minimize these objectionable qualities, nylon tire fabric is passed through a heat-treating unit, in which the fabric is stretched under conditions of controlled elevated temperatures and humidity. By such a hot-stretching treatment, the tendencies of nylon to heat-shrink during vulcanization and to "grow" during service are minimized.

A major difficulty encountered during the hot stretching of nylon has been in maintaining accurate control of the tension and hence the amount of stretch to which the nylon is subjected. One method presently used to develop tension in tire fabric is to snub the fabric at one point by first passing it over a series of rolls having a given peripheral speed, and then passing it over a second series of rolls driven at a higher speed. However, developing a high tension through several rolls operating at the same surface speed has the disadvantage that the surfaces of some of the rolls are subjected to severe wear due to slipping of the fabric on the rolls, and at the same time the fabric tends to be damaged by such slippage.

The present invention solves this problem of effectively controlling longitudinal fabric tension and fabric stretch by passing the fabric through one or more groups of rolls; each group comprising a plurality of rolls associated in pairs, and with each pair being driven at a speed different from that of the preceding pair, so that the change in tension is distributed throughout each group of rolls. In this manner roll wear is minimized, and the fabric is not damaged during the stretching process.

The general object of this invention is accordingly to provide a method and an apparatus for accurately imparting and controlling the tension on a continuous strip of fabric.

A more specific object is to change the tension in continuous strips of fabric by passing it around a plurality of rolls being driven at different speeds so as to distribute the tension increments among the rolls.

Other objects are to provide a fabric-treating unit which lends itself to simple adjustments over wide ranges of fabric tensions and stretch, which is easy to service, and whose components may be quickly and inexpensively repaired and replaced.

These and other objects and advantages will be more fully apparent from the following description of a preferred form of the invention, reference being had to the accompanying drawings in which:

Figure 1 is a top plan view, somewhat diagrammatic in nature, of a preferred form of the invention;

Figure 2 is a side elevation of the apparatus of Figure 1;

Figure 3 is a diagrammatic side elevation showing on an enlarged scale the manner in which the fabric passes through the apparatus of Figures 1 and 2; and Figure 4 is a chart showing the length changes in percent in nylon fabric as it passes through the apparatus of Figures 1 and 2.

The apparatus of the invention is shown and described in association with a dipping unit, in which nylon fabric is immersed to receive a coating which provides good adherence to rubber. After the fabric is dipped, it is dried and then heated and stretched under controlled conditions of temperature, tension and humidity. While the treatment of nylon tire fabric is described it should be observed that the apparatus and method may be applicable to the treatment of other fibers and materials.

The invention contemplates the treatment of twisted nylon cords covering a high range of denier, good results having been obtained with cords having a denier as low as 70, and as high as 840/3, 840/2/3. The apparatus may also be used for treating untwisted fibers and monofilaments.

Thus, referring first to Figures 1 and 2, nylon tire fabric 14 is withdrawn from a roll 15 mounted on a let-off stand 16. The fabric 14 passes through a splice-press 17 and rolls 18 into an accumulator 19 where enough fabric is stored to permit splices to be made without stopping the apparatus. Next, the fabric is dipped in a tank 20 containing a solution which enables rubber to adhere to the fabric in the vulcanization of a tire. The excess solution is removed by squeeze rolls 21 and the fabric passes vertically into a drying tower 22, where the fabric is under a slight tension. Emerging from the dryer, the fabric passes through a group of rolls, indicated generally at 23, which impart a tension of about 400 lbs. per inch of width to the fabric. The manner in which this tension is produced will be described in more detail later. The fabric under this increased tension then passes up into a heating tower 24. Leaving this heat-stretching tower 24, the fabric passes through a second group of rolls 25 and as it passes through these rolls, the tension is reduced to about 200 lbs. per linear inch of fabric. The fabric then passes through heating tower 26 and through another group of rolls shown generally at 27, wherein the fabric tension is further reduced. The fabric finally passes through an accumulator 28 and is wound into rolls 29 on a wind-up stand 30.

Essentially, the invention is embodied in a plurality of closely spaced rolls, such as the groups of rolls 23, 25, and 27, in which the rolls are driven at different speeds to change the tension in the fabric.

For example, consider first the group of rolls indicated at 23. The nylon fabric 14 is delivered to this group of rolls by the two squeeze rolls 21 which have a peripheral speed of about 60 yards per minute. The group 23 comprises 3 pairs of rolls 1, 1a, 2, 2a and 3, 3a and the single roll 4, all of which are similar in construction. The fabric is stretched first by the pair of rolls 1 and 1a which are driven at 50.6 r.p.m. and which have a diameter of 14", so that they have a peripheral speed of 61.8 yards per minute. This first pair of rolls thus stretches the fabric about 3%. The fabric then passes through rolls 2 and 2a comprising the second pair, which are driven at a peripheral speed of 62.7 yards per minute, thereby stretching the fabric an additional 1.5%. The rolls 3 and 3a comprising the third pair are driven at a speed of 63.6 yards per minute giving a further stretch of 1.5%. The fabric then passes over the roll 4 at a speed of 64.8 yards per minute giving a further stretch of 2%.

In passing through this group of rolls, the fabric is thus stretched a total of 8% and the fabric tension has gradually increased until it is 400 lbs. per inch of width.

At the points of highest tension changes, single rolls such as 4, 5 and 8, each driven by its own motor, have been used in place of pairs of rolls.

In the heating tower 24 the fabric tends to stretch and in order to maintain the desired tension of 400 lbs. per inch the fabric is pulled out of the tower by roll 5 of roll-group 25 at a speed of 67.8 yards per minute. Coming out of tower 24, the fabric has been stretched a total of 13%. The roll group 25 is intended to reduce this stretch slightly.

From roll 5 the fabric proceeds through rolls 6 and 6a comprising a first pair, which are driven at a peripheral speed of 67.6 yards per minute. This pair of rolls thus relaxes the tension about .5%. The rolls 7 and 7a comprising the second pair, are driven at a peripheral speed of 67.2 yards per minute, relaxing the fabric further by .5%. In passing through the group of rolls 25, the fabric length has thus shrunk 1%, and the fabric tension has gradually dropped to 200 lbs. per inch.

The fabric continues through the heating tower 26 with no tension change and then travels through roll group 27 which has the function of dropping the fabric tension so that the tension at the wind-up 30 is about the same as it was at the let-off 16.

The fabric length tends to change slightly in the heating tower 26, and to maintain the tension of 200 lbs. per inch, the fabric is pulled out of tower 26 by roll 8 driven at a peripheral speed of 68.2 yards per minute, over idling water cooled rolls 12 and 13.

The fabric then passes through rolls 9 and 9a, comprising the first pair which are driven at a peripheral speed of 67.5 yards per minute, thereby relaxing the fabric 1.5%. The rolls 10 and 10a comprising the second pair are driven at a peripheral speed of 66.6 yards per minute, thus further shrinking the length of the fabric by 1.5%.

Rolls 11 and 11a, comprising the last pair, are driven at a peripheral speed of 66.3 yards per minute, thus shrinking the fabric an additional .5%.

The fabric, in passing through this group of rolls, is thus shrunk a total of 3.5%, and the fabric tension has decreased accordingly.

It will thus be seen that the fabric of this example has been stretched a total of approximately 10.5% in passing through the apparatus.

In order to gain maximum efficiency from the rolls and to reduce slippage, fabric damage, and roll wear, the rolls are shown to have a rather large angular wrap-around, i.e. the fabric follows the surface of the rolls a considerable distance. For example, the angular wrap-around is between 162° and 196° for the end rolls in a group, and about 210°–213° for the inner rolls in a group.

Summing up, the invention can be used either to impart considerable tension as in roll group 23 or to decrease as in 25 and 27. It is understood that the invention is not intended to be limited to specific embodiment described herein, but that the invention may be modified by those skilled in the art without departing from the spirit and scope of the invention, the essential features of which are summarized in the appended claims.

I claim:

1. Apparatus for alternately stretching and relaxing tension in continuously moving tire cord fabric material, to remove residual stretch therein and to impart non-shrinkability therein, comprising at least three spaced groups of paired fabric-transporting and snubbing rolls and fabric heat-treating zones interposed between said groups, the rolls of any said pair of rolls having substantially equal diameters and being driven at the same speed, any roll pair within the first of said groups being driven at a speed greater than that of a preceding pair of rolls of said first group, any roll pair within the second and third said groups, respectively, being driven at a speed less than that of the preceding pair of rolls in said group, respectively, the speed of the initial roll pair in each of the said last-mentioned groups being greater than that of the last roll pair in the preceding group, whereby the tire cord material passing through the apparatus will be successively hot-stretched, relaxed, again hot-stretched, and finally relaxed to set the cord, remove residual stretch, and eliminate heat-shrinkability in the tire cords.

2. Apparatus for treating continuously moving nylon tire cord material, comprising at least three spaced groups of paired fabric-transporting rolls and fabric heat-treating zones interposed therebetween, the rolls of any said pair having substantially equal diameters, and being driven at the same speed, any roll pair within the first of said groups being driven at a speed greater than that of the preceding pair, any roll within the second and third said groups, respectively, being driven at a speed less than that of the preceding pair, and the speed of the initial roll pair in each of the said last-mentioned groups being greater than that of the last roll pair in the preceding group, for hot-stretching the nylon cords to remove residual stretch and to impart resistance to heat-shrinking.

3. Apparatus for hot-stretching and hot-shrinking continuously moving tire cord fabric material, comprising at least three spaced groups of paired fabric-transporting rolls and fabric heat-treating zones interposed between each pair of said groups, the rolls of said first group being driven at succesively increased speed, the rolls of the second group being driven at succesively decreasing speed, and the first pair of rolls of the third group being driven at speeds faster than the speed of the last pair of rolls of said second group, and the succeeding pairs of rolls of said third group being driven at successively slower speeds than the speed of said first pair of rolls of said third group.

References Cited in the file of this patent

UNITED STATES PATENTS 2,321,635     Taylor                June 15, 1943